United States Patent [19]

Baird

[11] Patent Number: 5,758,346
[45] Date of Patent: May 26, 1998

[54] CONVERTING REPRESENTATIONS OF YEAR

[75] Inventor: William J. Baird, Sterling Heights, Mich.

[73] Assignee: Electronic Data Systems Corporation, Plano, Tex.

[21] Appl. No.: 790,411

[22] Filed: Jan. 29, 1997

[51] Int. Cl.$^6$ .................................................. G06F 17/30
[52] U.S. Cl. .................................................. 707/101; 707/1
[58] Field of Search .................................. 395/601, 611, 395/612; 707/101, 1

[56] References Cited

U.S. PATENT DOCUMENTS

| | | | |
|---|---|---|---|
| 5,600,836 | 2/1997 | Alter | 395/612 |
| 5,630,118 | 5/1997 | Shaughnessy | 395/601 |
| 5,644,762 | 7/1997 | Soeder | 395/606 |
| 5,668,989 | 9/1997 | Mao | 707/101 |

OTHER PUBLICATIONS

Martin S. Matthews, Excel 4 For Windows Made Easy, Osborne McGraw-Hill (New York, Jan. 1992), pp. 343-353.
Paul R. Lintz, Examiner's Exhibit A, Excel 7.0a Output, Jul. 7, 1997, p. 1.

*Primary Examiner*—Paul R. Lintz
*Attorney, Agent, or Firm*—L. Joy Griebenow

[57] ABSTRACT

A system is provided for converting representations of year. The system includes a database which stores a representation of year in either a two-digit format or a four-digit format. A processor, coupled to the database, converts the representation into the other of the two-digit format or the four-digit format if the represented year falls within a floating window of years. If the represented year does not fall within the floating window, the processor rejects the representation.

17 Claims, 4 Drawing Sheets

CONVERTING REPRESENTATIONS OF YEAR

TECHNICAL FIELD OF THE INVENTION

This invention relates in general to the field of information services, and more particularly to converting representations of year.

BACKGROUND OF THE INVENTION

In many computing applications, data for calendar year, model year, business year, fiscal year, and the like, is represented as two digits. For example, the year 1967 can be represented by the digits "67." During the 1900's, there was a tacit understanding in the computer industry that a two digit year notation "YY" represented the year of 19YY. As we approach the year 2000, however, that tacit, industry-wide understanding becomes invalid. For example, at the turn of the century and afterwards, the notation of "50" could represent either the year 1950 or the year 2050.

Various systems and techniques have been developed to address the problem associated with the year 2000. These prior systems and techniques, however, were undesirable for any number of reasons, such as prohibitive expense, incompatibility with other systems and techniques, limited utility, and misinterpretation of data. Accordingly, a need has arisen for an improved two-digit year system and technique for resolving the year 2000 problem.

SUMMARY OF THE INVENTION

In accordance with the present invention, the disadvantages and problems associated with prior systems and techniques for addressing the year 2000 problem have been substantially reduced or eliminated.

In accordance with one embodiment of the present invention, a system is provided for converting data representations of year. The system includes a database which stores a representation of year data in either a two-digit format or a four-digit format. A processor, coupled to the database, converts the representation into the other of the two-digit format or the four-digit format if the represented year falls within a floating window of years. If the represented year does not fall within the floating window, the processor rejects the representation.

In accordance with another embodiment of the present invention, a system for converting representations of year is provided. The system includes a database which stores a representation of year data in either a two-digit format or a four-digit format. A processor, coupled to the database, purges the representation from the database at a predetermined time, such as, for example, the beginning or the end of the current year.

In accordance with still another embodiment of the present invention, a method is provided for converting representations of year. In the method, a representation of year data in either a two-digit format or a four-digit format is received. It is determined whether the represented year falls within a floating window of years. The representation is converted into the other of the two-digit format or the four-digit format if the represented year falls within the floating window of years. The representation is rejected if the represented year does not fall within the floating window of years.

Important technical advantages of the present invention include a rejection technique utilizing a floating window which comprises a range of years. The floating window is defined by various parameters. A separate set of values for these parameters may be provided for different software elements and representations of years. The parameter values for a particular software element and the various representations are selected so that representations of years falling within the floating window defined by these values will be properly converted from either from two-digit representations into four-digit representations, or vice versa. That is, the floating window operation confirms that a two-digit or four-digit representation of a year is not converted into a non-corresponding four-digit or two-digit representation. Accordingly, the converted representations can be utilized by such software element. On the other hand, any representations of year data outside of the appropriate floating window are rejected, and accordingly, are not utilized by the corresponding routine, program, application, or the like. Therefore, the software elements will not be corrupted by incorrect information.

Another technical advantage of the present invention includes utilizing a default value of forty for both low and high offset parameters which partially define a floating window comprising a range of years. The low offset parameter is subtracted from a reference year in order to define the earliest year in the range; the high offset parameter is added to the reference year in order to define the latest year in the range. The use of forty for each of these parameters is preferred because forty is a multiple of ten and its use as a default value for the low and high offset parameters facilitates the addition and subtraction from the reference year. Furthermore, forty is the largest multiple of ten which can be added and subtracted to a particular year in order to define the broadest range of years less than or equal to one hundred.

Yet another advantage of the present invention includes providing separate sets of values for the low offset and high offset parameters according to each routine, program, application, or the like, supported by conversion system 10. The range of the most relevant years for each software element may differ. By providing separate sets of values for the offset parameters, the floating window can be specifically tailored for each software element.

Still another technical advantage of the present invention includes a purge feature in which some representations of year data are selectively deleted or purged from a database or from a memory at predetermined intervals, such as the beginning or end of each year.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–5 of the drawings, like numerals used for like and corresponding parts of the various drawings.

Figure 1:
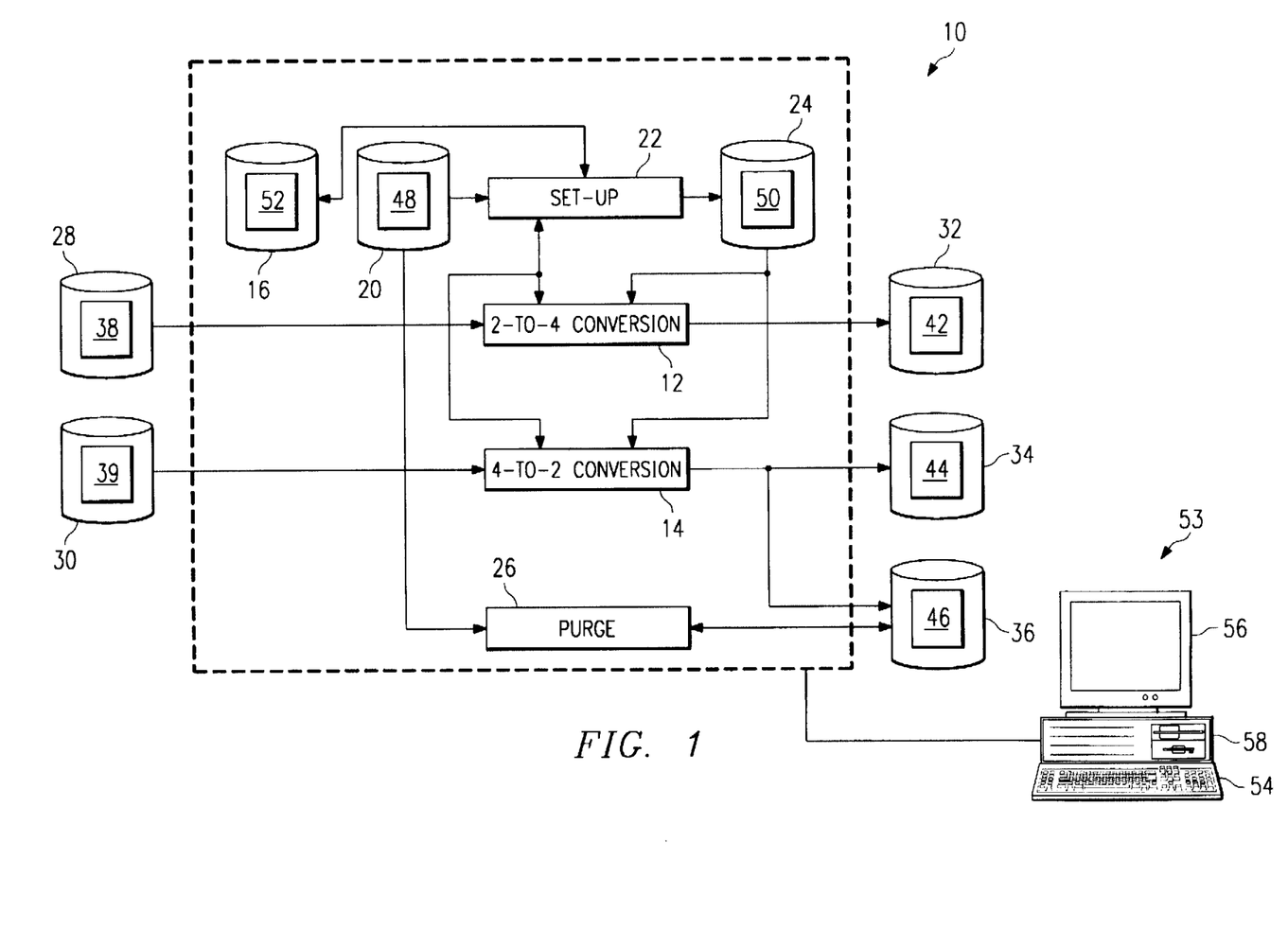
FIG. 1 illustrates a system for converting representations of year, according to an embodiment of the present invention.

FIG. 1 illustrates a system 10 for converting representations of year, according to an embodiment of the present invention. As used herein, the term "year" can be specified for any appropriate reference, such as Gregorian calendar year, model year, business year, fiscal year, and the like. Conversion system 10 may support one or more software elements, such as routines, programs, applications, or the like, which operate upon information specifying calendar dates, and in particular, representations of year in a two-digit or four-digit format. Conversion system 10 can be maintained separately from the software elements which it supports, or alternatively, can be at least partially contained or integrated within the same. As shown, conversion system 10 may include a two-to-four conversion module 12, a four-to-two conversion module 14, an archive memory 16, a current date memory 20, a set-up module 22, a set-up memory 24, and a purge module 26.

Generally, conversion system 10 receives, forwards, rejects, processes, or and/or generates two-digit and four-digit representations of year. In one embodiment, conversion system 10 may be disposed between the software elements it supports and one or more sources (e.g., other software elements) of two-digit and four-digit representations operated upon by conversion system 10. In the embodiment as shown in FIG. 1, these two-digit and four-digit representations may be specified in data contained within various databases or memories, including input two-digit memory 28, input four-digit memory 30, output four-digit memory 32, rejected output two-digit memory 34, and/or accepted output two-digit memory 36. Each of these memories 28–36 can reside in the same or separate suitable storage media, such as random access memory (RAM), read-only memory (ROM), disk, tape storage, or other suitable volatile or non-volatile data storage system. Each memory 28–36 can also be a relational database.

Input two-digit memory 28 and input four-digit memory 30 receive, store, and forward input two-digit information 38 and input four-digit information 39, respectively. Input two-digit information 38 and input four-digit information 39 comprise "raw data" to be processed by conversion system 10 before such data is used by one or more software routines, programs, or applications. Specifically, input two-digit information 38 may comprise information for various years or calendar dates, the year for each of such dates being represented by two digits (i.e., two-digit format). Similarly, input four-digit information 39 also comprises information for various years or calendar dates, the year for such dates being represented by four digits (i.e., four-digit format). In one embodiment, both input two-digit information 38 and input four-digit information 39 can be separated, divided, or formatted into one or more lists, files, or other suitable groupings, wherein each grouping is converted by conversion system 10 for utilization by a software element in a particular operation.

Each of output four-digit memory 32, rejected output two-digit memory 34, and accepted output two-digit memory 36 receives, stores, and forwards information output or generated by conversion system 10. In particular, memories 32, 34, and 36 contain output four-digit information 42, rejected output two-digit information 44, and accepted output two-digit information 46, respectively. Like input information 38 and 39, in one embodiment, output information 42, 44, and 46 can be separated, divided, or formatted into one or more lists, files, or other suitable groupings. Each grouping may comprise information that is utilized by a software element in a particular operation. Output four-digit information 42, rejected two-digit information 44, and accepted two-digit information 46 are described below in more detail.

Two-to-four conversion module 12 of conversion system 10 is coupled to input two-digit memory 28 and output four-digit memory 32. The functionality of two-to-four conversion module 12 as described herein may be performed by a processor, such as a mainframe, file server, work station, or other suitable data processing facility running appropriate software. Two-to-four conversion module 12 can receive input two-digit information 38 from input digit memory 28.

Two-to-four conversion module 12 primarily functions to convert each two-digit representation of a year into a four-digit representation of the same year. In one embodiment, this is accomplished by performing a mathematical calculation upon each two-digit representation (generally, "YY") of year to generate a corresponding four-digit representation (generally, "CCYY"). An exemplary calculation is given by the following equation:

$$CCYY=RP+mod(100+YY-mod(RP, 100), 100)$$

where "RP" is a numerical value for a reference point (described below) and "mod" denotes the mathematical function "modulus", which returns the integer remainder resulting from the division of a first integer by a second non-zero integer. The four-digit representations generated by two-to-four conversion module 12 constitute four-digit information 42, which two-to-four conversion module 12 forwards to output four-digit memory 32.

Four-to-two conversion module 14 is coupled to input four-digit memory 30, rejected output two-digit memory 34, and accepted output two-digit memory 36. The functionality of four-to-two conversion module 14 can be performed by a processor, such as a mainframe, file server, work station, or other suitable data processing facility running appropriate software. This processor may be the same or separate from that processor which performs the functionality for two-to-four conversion module 12. Four-to-two conversion module 14 receives input four-digit information 39 from input four-digit memory 30. As described above, input four-digit information 39 may comprise one or more four-digit representations of year.

Four-to-two conversion module 14 primarily functions to convert these four-digit representation of year into appropriate two-digit representations. In one embodiment, the conversion is accomplished by performing a mathematical calculation upon each four-digit representation (generally, "CCYY") to generate a corresponding two-digit representation (generally, "YY"). An exemplary calculation is given by the following equation:

$$YY=mod(CCYY, 100)$$

where "mod" denotes the mathematical modulus function. In another embodiment, a two-digit representation may be derived by discarding the first two digits of a four-digit representation. That is, "YY" is obtained by discarding the digits "CC" from "CCYY." During processing of input four-digit information 39, four-to-two conversion module 14 may generate some two-digit representations which are acceptable and some which should be rejected. The acceptable two-digit representations constitute accepted output two-digit information 46, which is forwarded to accepted output two-digit memory 36. The unacceptable two-digit representations constitute rejected output two-digit information 44, which is forwarded to rejected output two-digit memory 34.

Each of two-to-four conversion module 12 and four-to-two conversion module 14 may operate or function within a floating window of years. As described below, the floating window operation confirms that conversion system 10 properly converts the two-digit and four-digit representations into the appropriate corresponding four-digit and two-digit representations, respectively.

The floating window comprises a range of years specifically identified by reference to a particular reference point ("RP"), and defined by various parameters, including a "NOW" parameter, a reference point offset ("RPO") parameter, a low offset ("LO") parameter, and a high offset ("HO") parameter. The reference point comprises the earliest possible calendar year for a floating window and may be represented by four digits. The NOW parameter is used to represent current date/time. Like the reference point, the NOW parameter corresponds to a particular calendar year and may also be represented by four digits. This calendar year for the NOW parameter can be the current year or any previous year. The reference point offset parameter specifies the difference between the value of the reference point and the value of the NOW parameter. The reference point offset parameter can have any suitable value; in one embodiment, the reference point offset parameter may have a default value of fifty-nine ("59"). The low and the high offset parameters specify a number of years below and above, respectively, the calendar year identified by the NOW parameter. These offset parameters can have any suitable value. In one embodiment, a default value for each of the low and high offset parameters can be forty ("40"), although any other suitable offset value can be used.

Thus, exemplary floating windows may be defined as follows. The reference point can be the year 1937, and the calendar year for the NOW parameter can be 1996 (i.e., "1937+59"). Each of the low and the high offset parameters may have a value of forty, so that the floating window ranges from the year 1956 (i.e., "1996−40") to 2036 (i.e., "1996+40"). Likewise, if the NOW parameter is the year 1997 and a value of forty is used for each of the offset parameters, then the floating window ranges from the year 1957 (i.e., "1997−40") to 2037 (i.e., "1997+40"). From these examples, it can be seen that if the current year is consistently used as the NOW parameter, then the actual calendar years which are within the range of the window will vary from one year to the next—hence, the window "floats."

The floating window serves as a check to confirm or substantiate the integrity of data output, generated, forwarded, or otherwise processed by conversion system 10. A separate set of values for the different parameters may be provided for each routine, program, and application, and the like supported by conversion system 10 and according to the representations to be converted. The parameter values for a particular software element and the various representations are selected so that representations of year data falling within the floating window defined by these values will be properly converted. That is, the floating window operation confirms that conversion system 10 does not convert a two-digit or four-digit representation of a year into a non-corresponding four-digit or two-digit representation. Accordingly, the converted representations can be utilized by such software element after processing by conversion system 10. On the other hand, any representations of year outside of the appropriate floating window are rejected, and accordingly, are not utilized by the corresponding routine, program, application, or the like. Therefore, the software elements supported by conversion system 10 will not be corrupted by incorrect information.

A default value of forty for both the low and the high offset parameters provides a technical advantage in that the calculation or determination of a floating window is simplified. Because forty is a multiple of ten, its use as a default value facilitates the addition and subtraction from the NOW parameter in order to calculate the high and low bounds or range limits of the window. Furthermore, forty is the largest multiple of ten which can be added and subtracted to a particular year in order to define the broadest range of years less than or equal to one hundred. If a value of fifty was used as the default value, then the range of years would encompass one hundred and one years.

The value of fifty-nine is preferred for the reference point offset parameter because when it is combined with a reference year and a preferred default value of forty for the high offset, a total period of one hundred years is established (i.e., "59+1+40=100").

By providing separate sets of values for the offset parameters according to each routine, program, application, or the like, supported by conversion system 10, the floating window can be specifically tailored for each software element. That is, the range of the most relevant years for each software element may differ. For example, the most relevant years for a first application may fall within a range of plus or minus one year from the current year, whereas the most relevant years for a second application may fall within a range of minus five years and plus two years from the current year.

The floating window operation is supported generally by current date memory 20, set-up module 22, and set-up memory 24 in conversion system 10. Current date memory 20 may reside in a suitable storage medium, such as RAM, ROM, disk, tape storage, or other suitable volatile or non-volatile data storage system, which can be the same or separate from the data storage system containing the other memories 28–36 described herein. Current date memory 20 functions primarily to receive, store, and forward current date information 48, which can specify numerical values for the day, the month, and the year of the current date. In addition, for each routine, program, application, and the like, supported by conversion system 10, current date information 48 can also specify particular values for each of the parameters (e.g., NOW, low offset, and high offset) defining the corresponding floating window.

Set-up module 22 is coupled to current date memory 20. The functionality of set-up module 22 can be performed by any suitable processor, such as a mainframe, file server, or work station, running appropriate software. Such processor can be the same or separate from the processor or processors performing the functionality of conversion modules 12 and 14. Set-up module 22 receives current date information 48 from current date memory 20. Utilizing this information, set-up module 22 can configure or set-up an appropriate floating window of operation for each software element supported by conversion system 10. Conversion modules 12 and 14 may then operate within such floating window in order to convert two-digit and four-digit representations into corresponding four-digit and two-digit representations, respectively. The information output by set-up module 22 for the configured floating window constitutes set-up information 50.

Although set-up module 22 is illustrated as being separate from two-to-four conversion module 12 and four-to-two conversion module 14, it should be understood that in another embodiment, set-up module 22 may be at least partially integral to each of the conversion modules. In particular, the functions of set-up module 22 may be performed as initialization routines for the conversion modules 12 and 14.

Set-up memory 24 is coupled to set-up module 22, two-to-four conversion module 12, and four-to-two conversion module 14. Set-up memory 24 may reside in a suitable storage medium, such as RAM, ROM, disk, tape storage, or other suitable volatile or non-volatile data storage system. Such data storage system can be the same or separate from the data storage system(s) supporting the other memories described herein. Set-up memory 24 may receive and store set-up information 50 generated by set-up module 22. Furthermore, set-up memory 24 can also forward the set-up information 50 to each of two-to-four conversion module 12 and four-to-two conversion module 14 to support the floating window operation of the conversion modules.

Archive memory 16 is coupled to set-up module 22. Archive memory 16 may reside in a suitable storage medium, such as RAM, ROM, disk, tape storage, or other suitable volatile or non-volatile data storage system, which can be the same or separate from the data storage system(s) containing the other memories herein described. Archive memory 16 may be a relational database, and functions to receive, store, and forward archive information 52. Archive information 52 may specify one or more reference points corresponding to calendar years which are more than fifty-nine years prior to the current year.

Archive memory 16 supports an archive feature for conversion system 10. This archive feature may be activated or deactivated during operation of system 10. When deactivated, the NOW parameter of the floating window is set to the current year so that two-to-four conversion module 12 and four-to-two conversion module 14 operate upon two-digit and four-digit representations of relatively "current" calendar years. When the archive feature is activated, however, archive information 52 is used to define the floating window so that two-digit and four-digit representations of "older" calendar years may be operated upon by conversion modules 12 and 14. In archive mode, one of two options may be selected. Under the first option, the value of the low offset parameter can be increased so that the low bound of the window is an earlier calendar year. Under the second option, the NOW parameter is defined as some year prior to the current year so that the entire floating window is "shifted."

Purge module 26 is coupled to current date memory 20 and accepted two-digit memory 36. The functionality of purge module 26 may be performed by a processor, such as a mainframe, file server, work station, or other suitable data processing facility running appropriate software. This processor can be the same as that supporting two-to-four conversion module 12, four-to-two conversion module 14, and/or set-up module 22. Purge module 26 functions to selectively purge data from accepted two-digit memory 36 at the end of each year. This purging operation is described in more detail with reference to FIG. 5.

Conversion system 10 may operate on one or more computers, shown generally as computer 53. Computer 53 maintains and executes the instructions to perform the set-up operation, conversion of two-digit representations into four-digit representations, the conversion of four-digit representations into two-digit representations, and the purge operation. Computer 53 includes an input device 54, such as a key pad, touch screen, or other device that can accept information. An output device 56 conveys information associated with the operation of conversion system 10, including digital data, visual information, or audio information. Both input device 54 and output device 56 may include fixed or removable storage media, such as magnetic computer disk, optical disk, CD/ROM, or other suitable media to both receive output from and provide input to conversion system 10. One or more processors 58 and their associated memories execute instructions and manipulate information in accordance with the operation of conversion system 10 described herein.

Figure 2:
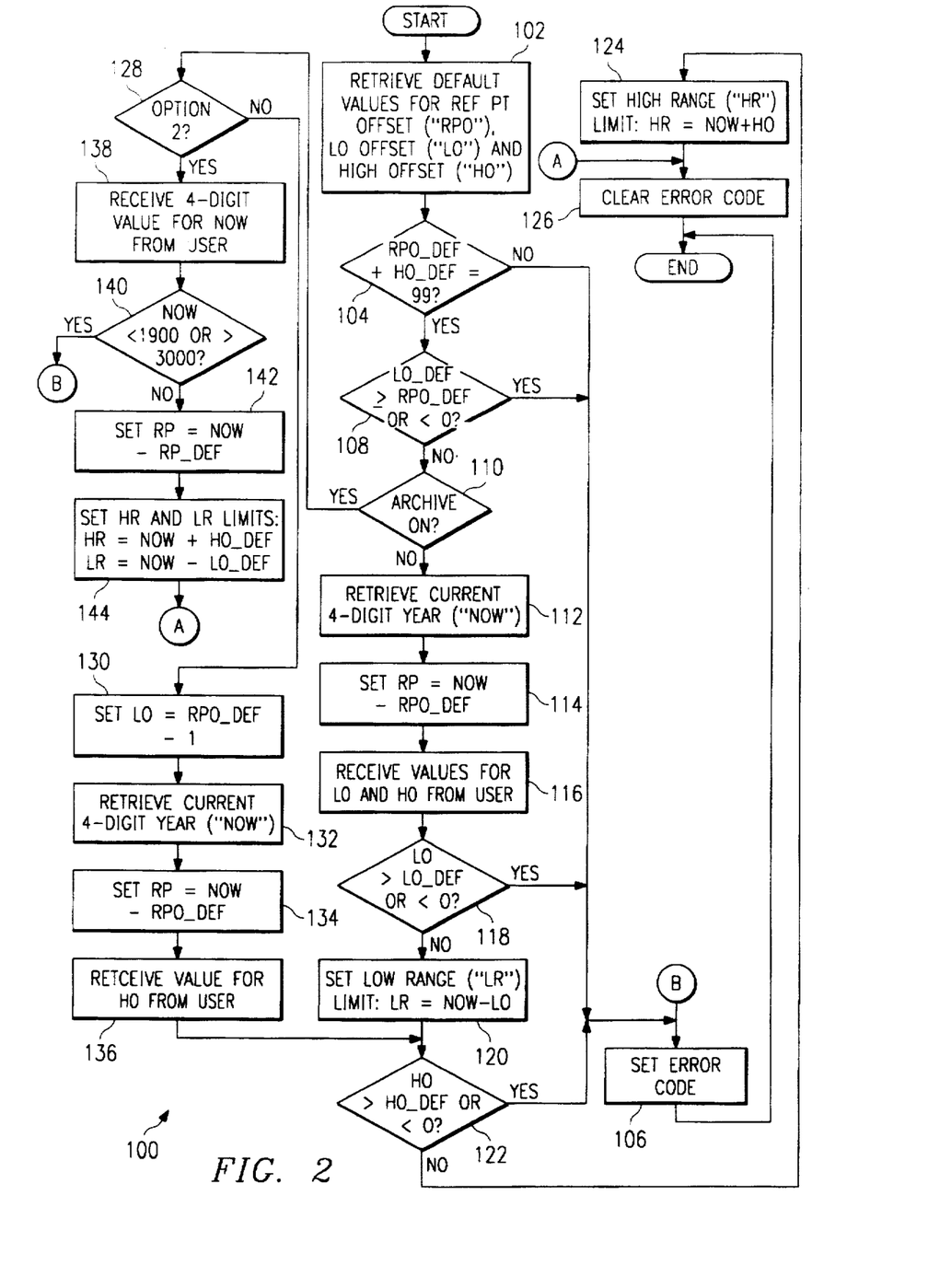
FIG. 2 is a flow chart of a method for setting up a window of operation, according to an embodiment of the present invention.

FIG. 2 is a flow chart of a method 100 for setting up a window of operation prior to other processing. For example, method 100 may be invoked when a particular routine, program, application, or the like, supported by conversion system 10 requires the conversion of information in a list, file, or other grouping of information contained in memory 28 or 30. In one embodiment, method 100 corresponds to the operation of set-up module 22. In another embodiment, method 100 may be performed by each of two-to-four conversion module 12 and four-to-two conversion module 14 as an initialization routine.

Method 100 begins at step 102 where set-up module 22 retrieves suitable values for each of the reference point offset (RPO), suitable values for the low offset ("LO") and a high offset ("HO") parameters from current date memory 20. The retrieved values for the offset parameters can be used to define the range of years for an appropriate floating window relative to the year corresponding to the NOW parameter. Separate offset values are preferably provided for each software element supported by conversion system 10. In one embodiment, if no other values are provided, a default value of "40" may be assigned to each of the high and low offset parameters, and a default value of "59" may be assigned to the reference point offset parameter. The default values for the offset parameters are referred to in FIG. 2 as "RPO_DEF", "LO_DEF", and "HO_DEF".

At step 104, set-up module 22 determines whether the sum of the default values for the reference point offset parameter and the high offset parameter is equal to ninety-nine ("99"). If not, then, in one embodiment, one of these default values is an improper value. Consequently, set-up module 22 sets an error code at step 106. Otherwise, if it is determined that the sum of the default values for the reference point and high offset parameters is equal to "99," then set-up module 22 moves to step 108.

At step 108, set-up module 22 determines whether the default value for the low offset parameter is greater than or equal to the reference point offset parameter default value or less than zero ("0"). If so, set-up module 22 moves to step 106 where it sets an error code. On the other hand, if the default value for the low offset parameter is between "0" and the default value for the reference point offset parameter, then set up module 22 proceeds to step 110.

At step 110, set-up module 22 determines whether a user of conversion system 10 has activated or "turned on" the archive feature. If the archive feature has not been activated, set-up module 22 retrieves the four-digit representation of the current year from current date memory 20 at step 112. This four-digit representation is used as the value for the NOW parameter. At step 114, set-up module 22 preferably sets the reference point ("RP") value to equal the value of the NOW parameter (corresponding to the current four digit year) minus the default value for the reference point offset parameter. Set-up module 22 receives values selected by a user for the high and low offset parameters at step 116.

At step 118, set-up module 22 determines whether the received value for the low offset parameter is greater than the low offset default value or less than "0." If the received low offset value is either greater than such default value or less than "0," it is an improper value for such parameter; consequently, set-up module 22 sets a error code at step 106. On the other hand, if the value of the low offset parameter is between "0" and the appropriate default value, then at step 120 set-up module 22 sets a low range ("LR") limit using the received value for the low offset. In particular, the low range limit is defined as the value of the NOW parameter minus the low offset value.

At step 122, set-up module 22 determines whether the received value for the high offset parameter is greater than the high offset default value or less than "0." If the received high offset value is either greater than its corresponding default value or less than "0," then it is an improper value for the high offset parameter; thus, set-up module 22 sets an error code at step 106. Otherwise, if the received value for high offset parameter is between "0" and the corresponding default value, set-up module 22 sets a high range ("HR") limit using the received value for the high offset parameter at step 124. Specifically, the high range limit is defined as the value of the NOW parameter plus the high offset value.

The low range limit and the high range limit correspond to the earliest calendar year and the latest calendar year, respectively, for the floating window. At step 126, set-up module 22 clears the error code. Method 100 then ends.

Referring again to step 110, if it is determined that the archive feature has been activated, then set-up module 22 determines which option (first or second) of the archive feature has been selected at step 128.

If the first option has been selected, then the low range limit of the floating window is "lowered" to an earlier year. In particular, set-up module 22 sets the value of the low offset parameter to equal the default value for the reference point offset minus one ("1") at step 130. At step 132, set-up module 22 retrieves the four-digit representation of the current year from current date memory 20; this is used as the value of the NOW parameter. Set-up module 22 then defines the reference point to equal the NOW value minus the default value for the reference point offset at step 134. At step 136, set-up module 22 receives a value for the high offset parameter from the user. Set-up module 22 then moves to step 122 where it determines whether the received value for the high offset parameter is greater than the high offset default value or less than "0." From this point, method 100 proceeds, as described above, to either set an error code at step 106 or, alternatively, to set the high range limit and clear the error code at steps 124 and 126.

If it is determined at step 128 that the second option of the archive feature has been selected, then the calendar year corresponding to the NOW parameter may be chosen as a year prior to the current year so that the entire floating window is "shifted." Thus, at step 138 set-up module 22 receives a four-digit value for the NOW parameter from the user. At step 140, set-up module 22 determines whether the received value for the NOW parameter is less than "1900" or greater than "3000." If the received NOW parameter value is either greater than "3000" or less than "1900," then it is an improper value for the NOW parameter. Consequently, set-up module 22 sets an error code at step 106.

Otherwise, if the received value for NOW parameter is between "1900" and "3000," then at step 142 set-up module 22 sets the value of the reference point to equal the NOW parameter value minus the default value of the reference point offset. At step 144, set-up module 22 sets the high range limit and the low range limit using the default values for the low offset and high offset parameters, respectively. In particular, the high range limit is defined as the value of the NOW parameter plus the high offset default value; the low range limit is defined as the value of the NOW parameter minus the low offset default value. As stated above, the low range limit and the high range limit correspond to the earliest calendar year and the latest calendar year, respectively, for the floating window.

Set-up module 22 then moves to step 126 where it clears the error code. Method 100 then ends.

Figure 3:
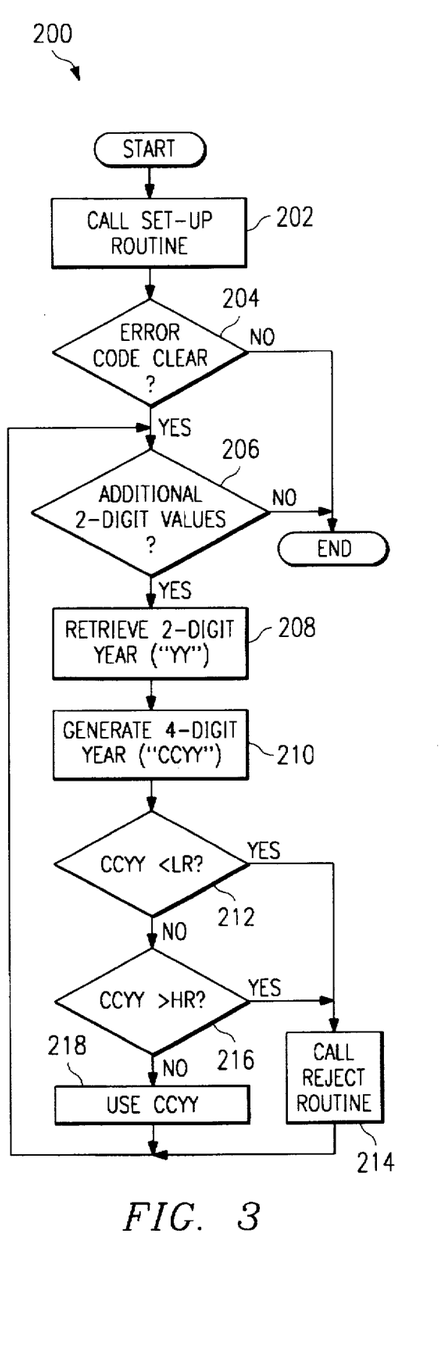
FIG. 3 is a flow chart of a method for converting a two-digit representation of year into a four-digit representation, according to an embodiment of the present invention.

FIG. 3 is a flow chart of a method 200 for converting one or more two-digit representations of year into corresponding four-digit representations. Method 200 corresponds to the preferred operation of two-to-four conversion module 12 shown in FIG. 1.

Method 200 may be initiated when a particular software routine, program, application, or the like, requires a four-digit representation of a year corresponding to a two-digit representation in input two-digit information 38 contained within input two-digit memory 28. Because input two-digit information 38 can be separated, divided, or formatted into one or more lists, files, or other suitable groupings, conversion can be performed on a per list basis, a per file basis, or any other suitable basis according to the requirements of the initiating software routine, program, or application.

In one embodiment, two-to-four conversion module 12 performs method 200 only once for each two-digit representation that is part of input two-digit information 38. In another embodiment, two-to-four conversion module 12 performs or repeats method 200 on a two-digit representation in input two-digit information 38 each time that a software element requires a corresponding four-digit representation.

Referring to FIG. 3, method 200 begins at step 202 where two-to-four conversion module 12 invokes or calls a set-up routine. This call activates set-up module 22 to perform the set-up routine corresponding to method 100 shown in FIG. 2, which, as previously described, sets up an appropriate floating window of operation defined by a high range limit ("HR") and a low range limit ("LR"). The initialization routine also may set one or more error flags in an error code.

At step 204, two-to-four conversion module 12 determines whether the error code associated with the set-up routine is clear. If two-to-four conversion module 12 determines that the error code is not clear, method 200 ends.

Otherwise, if it is determined that the error code is clear, then two-to-four conversion module 12 accesses input two-digit memory 28. At step 206, two-to-four conversion module 12 determines whether there are any two-digit representations of year to be converted at this time. If there are no two-digit representations which should be converted, method 200 ends.

Otherwise, if it is determined that there are two-digit representations to be converted, two-to-four conversion module 12 retrieves an appropriate two-digit year representation (generally, "YY") of a calendar year from input two-digit memory 28 at step 208. At step 210, two-to-four conversion module 12 generates a four-digit representation (generally, "CCYY") of the same year. In one embodiment, the four-digit year representation may be calculated as follows:

$$CCYY=RP+\mathrm{mod}(100+YY-\mathrm{mod}(RP, 100), 100)$$

where "mod" represents the mathematical function of modulus, which returns the integer remainder resulting from the division of a first integer by a second non-zero integer.

At step 212, two-to-four conversion module 12 determines whether the value of the generated four-digit representation is less than the low range limit ("LR") set by the set-up routine. If so, the four-digit representation is outside of the floating window, and accordingly, two-to-four conversion module 12 invokes or calls a reject routine at step 214. The reject routine generally functions to manage processing for invalid data.

If the value of the generated four-digit representation is not less than the low range limit, then at step 216 two-to-four conversion module 12 determines whether the value of the generated four-digit representation is greater than the high range limit ("HR") set by the set-up routine. If the value of the four-digit representation is greater than the high range limit, such representation is outside of the floating window. Consequently, two-to-four conversion module 12 calls the same or a separate reject routine at step 214.

If the value of the generated four-digit representation is not greater than the high range limit, then the four-digit representation is stored as output four-digit information 42 in output four-digit memory 32. The four-digit representation can be retrieved and used by the appropriate software routine, program, application, or the like, at step 218. Two-to-four conversion module 12 then returns to step 206 where it determines whether there are additional two-digit representations to be converted.

Two-to-four conversion module 12 repeats steps 206–218 until all two-digit representations in the current list, file, etc., have been converted into corresponding four-digit representation which are either used or rejected.

Figure 4:
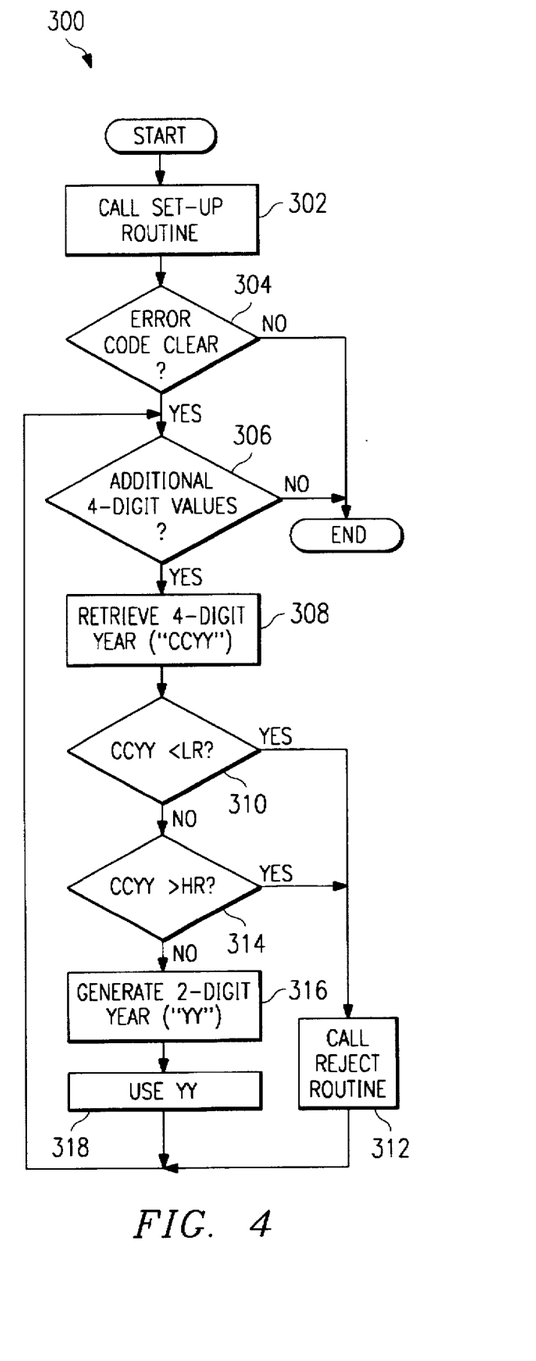
FIG. 4 is a flow chart of a method for converting a four-digit representation of year into a two-digit representation, according to an embodiment of the present invention.

FIG. 4 is flow chart of method 300 for converting one or more four-digit representations of year into corresponding two-digit representations. Method 300 corresponds to the preferred operation of four-to-two conversion module 14 of conversion system 10.

Method 300 can be initiated when a particular software element requires a two-digit representation of year corresponding to a four-digit representation in input four-digit information 39 contained within input four-digit memory 30. Conversion of input four-digit information 39 can be performed on a per list basis, a per file basis, or any other suitable basis according to the requirements of the initiating software element.

In one embodiment, four-to-two conversion module 14 performs method 300 only once for each four-digit representation that is part of input four-digit information 39. In another embodiment, four-to-two conversion module 14 performs or repeats method 300 on a four-digit representation in input four-digit information 39 each time that a software routine, program, application, or the like, requires the corresponding two-digit representation.

With reference to FIG. 4, method 300 begins at step 302 where four-to-two conversion module 14 calls or invokes the set-up routine. The call activates set-up module 22 to perform the set-up routine described with reference to FIG. 2. By initializing various parameters (e.g., the NOW parameter, the low offset parameter, and the high offset parameter), the set-up routine sets up an appropriate floating window of operation which is defined by a high range limit ("HR") and a low range limit ("LR"). In addition, one or more error flags in the error code for conversion system 10 may be set.

At step 304, four-to-two conversion module 14 determines whether the error code is clear after initialization or set-up. If it is determined that the error code is not clear, method 300 ends.

On the other hand, if it is determined that the error code is clear, four-to-two conversion module 14 accesses input four-digit memory 30. At step 306, four-to-two conversion module 14 determines whether there are any four-digit representations of year to be converted at the current time. If there are no four-digit representations which should be converted, method 300 ends.

If at step 306 it is determined that there are four-digit representations to be converted, four-to-two conversion module 14 retrieves an appropriate four-digit representation (generally, "CCYY") at step 308. At step 310, four-to-two conversion module 14 determines whether the value of the four-digit year representation is less than the low range limit ("LR") set by set-up module 22 during the initialization routine. If the value of the four-digit representation is less than the low range limit, then the representation falls outside of the floating window, and four-to-two conversion module 14 calls a reject routine at step 312. This reject routine may be the same as or separate from the reject routine summoned by two-to-four conversion module 12 during method 200 illustrated in FIG. 3.

On the other hand, if it is determined at step 310 that the value of the four-digit representation is not less than the low range limit, then at step 314 four-to-two conversion module 14 determines whether the value of the four-digit representation is greater than the high range limit ("HR") set by the set-up routine. If so, the four-digit representation is not within the range of the floating window, and four-to-two conversion module 14 calls or invokes the reject routine at step 312.

Otherwise, if it is determined that the value of the four-digit representation is not greater than the high range limit, then four-to-two conversion module 14 generates a corresponding two-digit representation (generally, "YY") at step 316. In one embodiment, the two-digit representation is generated by discarding the first two digits in the four-digit representation. That is, "CC" is discarded from "CCYY," yielding "YY." In another embodiment, the two-digit representation may be calculated from the following equation:

$$YY=\mathrm{mod}(CCYY, 100)$$

where "mod" represents the mathematical function of modulus. The generated two-digit representation will be within the floating window and constitutes accepted output two-digit information 46. The two-digit representation is stored in accepted output two-digit memory 36.

The generated two-digit representation may be retrieved and used by the initiating software routine, program, application, or the like, at step 318. Four-to-two conversion module 14 then returns to step 306 where it determines whether there are additional four-digit representations which should be converted.

Four-to-two conversion module 14 repeats steps 306–318 until all four-digit representations which should be processed have been converted into two-digit representations, which are either used or rejected.

Figure 5:
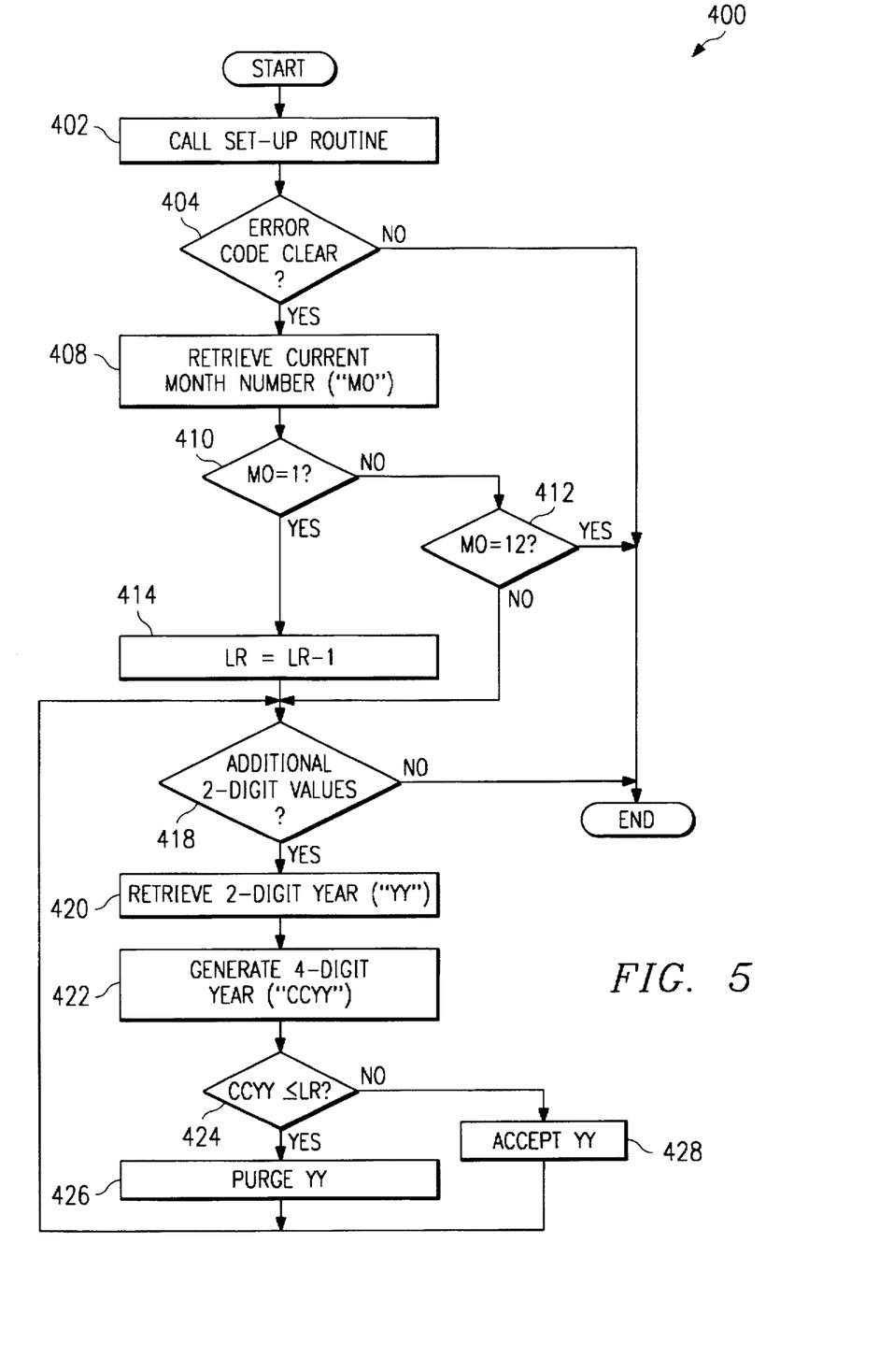
FIG. 5 is a flow chart of a method for purging information, according to an embodiment of the present invention.

FIG. 5 is a flow chart of a method 400 for purging information from memory 36 which stores accepted two-digit information 46 generated by four-to-two conversion module 14. Method 400, which may be initiated or invoked at the end of each calendar year, corresponds to the operation of purge module 26. In other embodiments, method 400 may be invoked at the beginning of each calendar year, or, alternatively, at the beginning or end of any suitable period, such as a fiscal year, model year, business year, or the like, which does not coincide with a calendar year.

Method 400 may be performed separately for each set of related accepted two-digit representations that are generated for a particular software routine, program, application, or the like. The values for various parameters (e.g., the NOW parameter, the low offset parameter, and the high offset parameter) can differ for each software element.

Method 400 begins at step 402 where purge module 26 invokes or calls a set-up routine. This call activates set-up module 22 to perform the set-up routine of method 100 shown in FIG. 2. During the set-up routine, set-up module 22 sets-up a suitable floating window of operation defined by high and low range limits ("HR" and "LR", respectively), and one or more error flags may be set in the error code.

At step 404, purge module 26 determines whether the error code associated with the set-up routine is clear. If the error code is not clear, method 400 ends.

Otherwise, if it is determined that the error code is clear, then at step 408, purge module 26 retrieves a value for the current month ("MO") from current date memory 20. At step 410, purge module 26 determines whether the month value equals one ("1") representing the month of January. If not, purge module 26 determines whether the value of the current month equals twelve ("12") representing the month of December at step 412. If the current month value equals twelve, method 400 ends. Otherwise, if the value of the current month does not equal twelve, then purge module 26 moves to step 418.

Referring again to step 410, if it is determined that the month value equals one, then at step 412 purge module 26 resets the low range limit to equal its current value minus 1. Purge module 26 then move to step 418.

The performance of steps 402-414 establishes the relevant or appropriate floating window for the particular routine, program, application, or the like, associated with information to be purged.

At step 418, purge module 26 accesses accepted output two-digit memory 36 and determines whether there are any two-digit representations within memory 36 which should be reviewed for purge. If no representations exist, then method 400 ends. Otherwise, if there are two-digit representations which should be reviewed, four-to-two conversion module 14 retrieves an appropriate two-digit representation (generally, "YY") at step 420.

At step 422, purge module 26 generates a four-digit representation (generally, "CCYY") corresponding to the two-digit representation. In one embodiment, this four-digit representation may be calculated mathematically as follows:

$$CCYY=RP+mod(100+YY-mod(RP, 100), 100)$$

where "mod" represents the mathematical function of "modulus."

At step 424, purge module 26 determines whether the value for the generated four-digit representation is less than or equal to the currently defined low range limit. If so, the corresponding two-digit representation is outside of the appropriate floating window. Accordingly, at step 426, the corresponding two-digit representation is purged from accepted output two-digit information 46 contained within accepted output two-digit memory 36.

On the other hand, if at step 424 it is determined that the value of the generated four-digit representation is not less than or equal to the low range limit, the corresponding two-digit representation is accepted at step 428, and such two-digit representation is not purged from accepted output two-digit information 46 in memory 36.

Purge module 26 then returns to step 418 where it determines whether additional two-digit representations contained within accepted output two-digit memory 36 should be considered for purge.

Purge module 26 repeats steps 418-428 until it has reviewed all appropriate two-digit representations for year data in accepted output two-digit memory 36, and either retained or purged such representations from the memory.

Accordingly, the present invention provides a system and corresponding methods for confirming or substantiating the integrity of information utilized by various software routines, programs, applications, or the like, which otherwise might be problematic because of the year 2000 problem.

Although the present invention and its advantages have been described in detail, it should be understood that various changes, substitutions, and alterations can be made therein without departing from the spirit and scope of the invention as defined by the appended claims.

What is claimed is:

1. A system for converting representations of year, the system comprising:
   a database operable to store a representation of year in either a two-digit format or a four-digit format, the database further operable to store at least one value for each of a set of parameters defining a floating window; and
   a processor coupled to the database, the processor operable to perform a set-up routine in order to configure the floating window utilizing the values for the parameters, the processor further operable to convert the representation into the other of the two-digit format or the four-digit format if the represented year falls within the floating window of years, the processor further operable to reject the representation if the represented year does not fall within the floating window of years.

2. The system of claim 1, wherein the database is further operable to store a converted representation.

3. The system of claim 2, wherein the processor is further operable to purge the converted representation from the database at a predetermined time.

4. The system of claim 1, wherein the parameters comprise a reference year parameter, a high offset parameter, and a low offset parameter.

5. The system of claim 1, wherein the parameters comprise a high offset parameter having a default value of forty and a low offset parameter having a default value of forty.

6. The system of claim 1, wherein the parameters comprise a reference year parameter having a default value of the current year.

7. The system of claim 1, wherein the processor is further operable to determine whether the representation falls within the floating window of years.

8. The system of claim 1, wherein the database comprises:
   an input two-digit memory operable to store at least one representation of year in a two-digit format; and
   an input four-digit memory operable to store at least one representation of year in a four-digit format.

9. The system of claim 1, wherein the database comprises:
   an accepted output memory operable to store at least one representation of year converted by the processor; and
   a rejected output memory operable to store at least one representation of year rejected by the processor.

10. The system of claim 3, wherein the predetermined time coincides with either a beginning or an end of a current year.

11. The system of claim 3, wherein the predetermined time coincides with either a beginning or an end of a fiscal year.

12. The system of claim 1, wherein the database is further operable to store information identifying a current date.

13. A method for converting representations of year, the method comprising the steps of:

receiving a value for each of a set of parameters for defining a floating window of years;

configuring the floating window of years in response to the received values;

receiving a representation of year in either a two-digit format or a four-digit format;

determining whether the represented year falls within the floating window of years;

converting the representation into the other of the two-digit format or the four-digit format if the represented year falls within the floating window of years; and rejecting the representation if the represented year does not fall within the floating window of years.

14. The method of claim 13, wherein the step of converting further comprises the step of performing a mathematical calculation on the representation.

15. The method claim 13, further comprising the steps of:

storing a converted representation into an accepted output memory; and purging the converted representation from the accepted output memory at a predetermined time.

16. The method of claim 13, wherein the parameters comprise a high offset parameter having a default value of forty and a low offset parameter having a default value of forty.

17. The method of claim 13, further comprising the step of storing a rejected representation into a rejected output memory.

* * * * *